United States Patent [19]
Marsh

[11] 3,805,414
[45] Apr. 23, 1974

[54] SYNCHROSCOPE TRAINING DEVICE

[75] Inventor: David R. Marsh, Mountain View, Calif.

[73] Assignee: The Singer Company, Binghamton, N.Y.

[22] Filed: June 2, 1972

[21] Appl. No.: 258,996

[52] U.S. Cl. .......................... 35/19 A, 35/10, 35/13
[51] Int. Cl. .......................................... G09b 23/06
[58] Field of Search ............. 35/1, 8 R, 10, 11, 13, 35/19 R, 19 A, 12 D, 12 E, 12 T, 12 F, 12 L, 12 S, 48 R, 22 R; 324/91; 318/601, 602, 603, 604, 227, 231, 171; 340/187, 172

[56] References Cited
UNITED STATES PATENTS

| 3,343,063 | 9/1967 | Keeney, Jr. et al. | 318/231 X |
| 3,621,350 | 11/1971 | Masterman | 318/231 X |
| 2,685,674 | 8/1954 | Rich et al. | 324/91 X |
| 3,372,579 | 3/1968 | Hobel et al. | 73/141 |
| 3,226,617 | 12/1965 | Smith et al. | 318/604 X |

*Primary Examiner*—Harland S. Skogquist
*Assistant Examiner*—Vance Y. Hum
*Attorney, Agent, or Firm*—William Grobman; James C. Kesterson

[57] ABSTRACT

This invention comprises a device for simulating the operation of a synchroscope for use in training personnel in paralleling alternators. The training device comprises two sources of alternating signals, at least one of which is variable in frequency; a synchroscope for indicating when the signals from the two sources are equal in frequency; and a phase comparator for indicating when the two signals are also in phase. The phase comparator includes means for sensing when both signals are of the same polarity, means for turning on an oscillator during the time that both signals are of the same polarity, means for counting the output from the oscillator, and means for converting the contents of the counter into a signal which indicates the phase relationship of the two signals.

7 Claims, 2 Drawing Figures

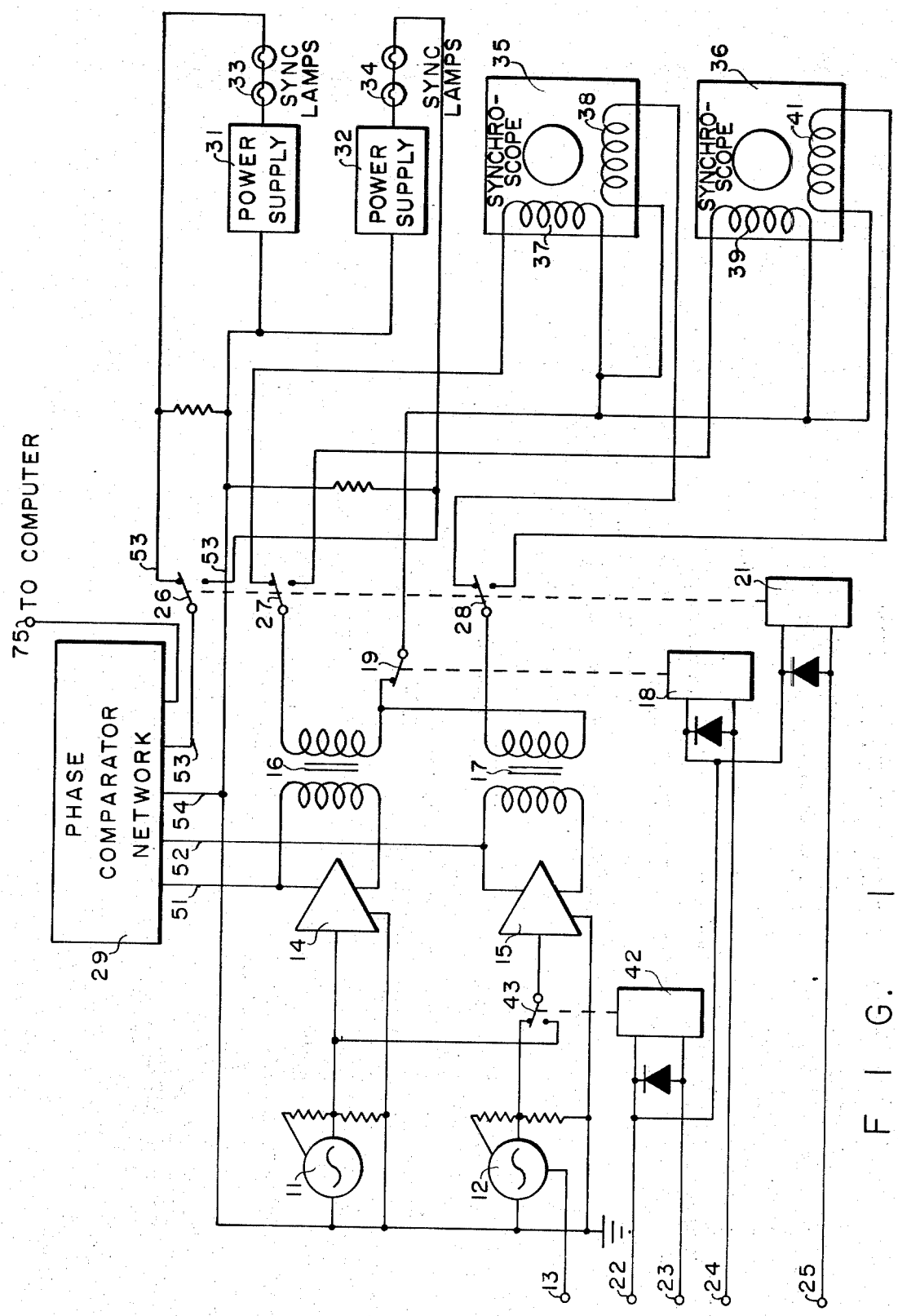

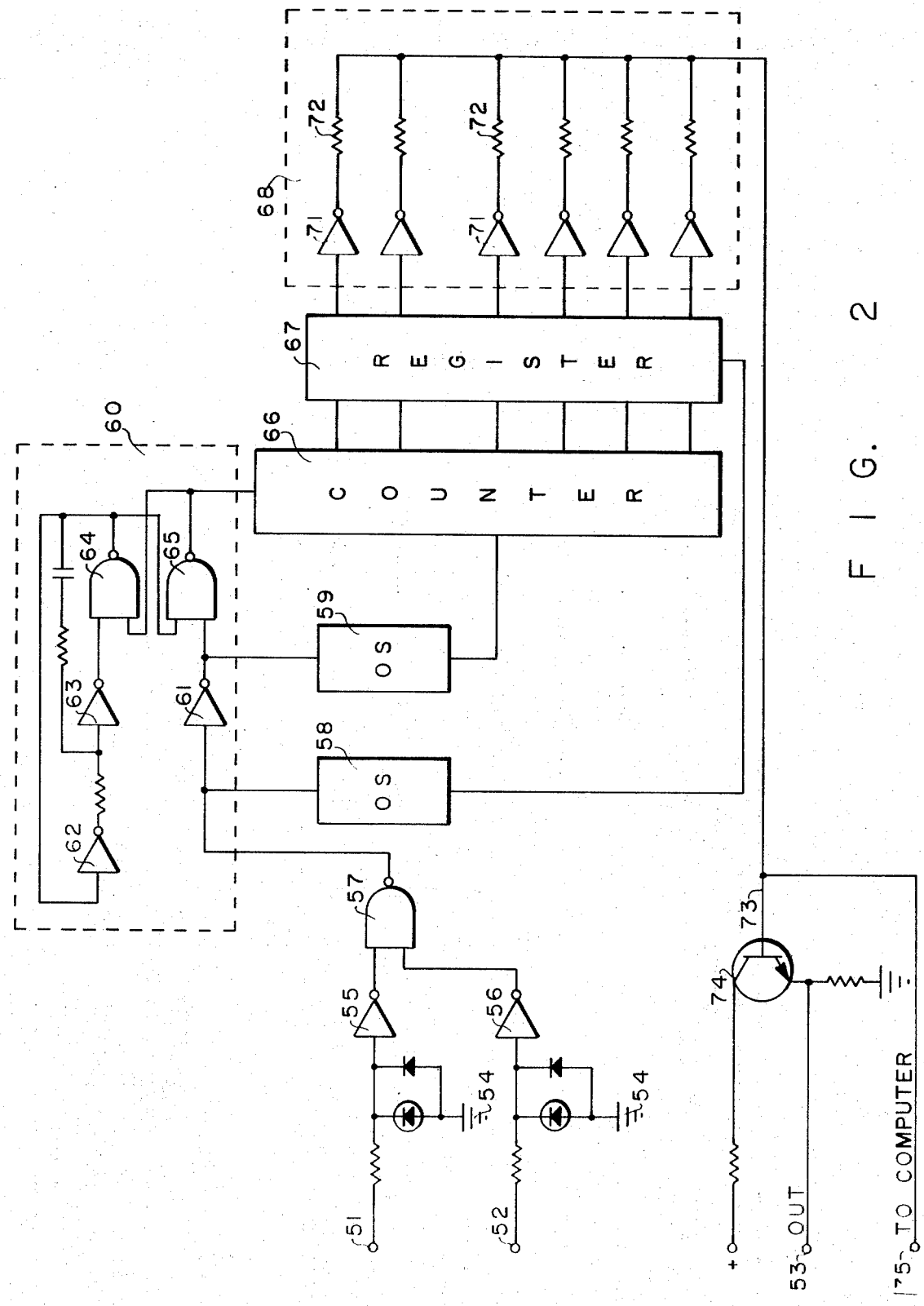

SYNCHROSCOPE TRAINING DEVICE

CROSS-REFERENCES TO RELATED APPLICATIONS

This specification describes an improvement over the system set forth in the copending patent application Ser. No. 251,892, filed May 9, 1972, for "Synchroscope Training Device," by Evan E. M. Lloyd.

BACKGROUND OF THE INVENTION

1. Field of the Invention

This invention relates to training devices and more particularly to systems for training personnel in the use of synchroscopes for paralleling alternators.

2. Description of the Prior Art

It has been standard practice in many industries, including the power plant industry, to train new personnel directly on the equipment itself. In the past, this system worked out quite well. Often, trainees worked the night shift, or the graveyard shift, when the load was light and spare generating capacity was available. Under these conditions, alternators can be started, brought up to speed, and paralleled to the power network without disrupting the operation of the system or of the power supplied to the customers. However, in recent years, the use of electrical equipment has increased so that the generating plant no longer has the excess capacity during the night that it once had. Automatic air conditioners and similar systems during the summer months and electrical heating devices—space heaters, electric blankets, electric hot water heaters—all tend to load the system as a whole, both day and night. Therefore, the ability to use idle generators for training purposes is no longer present. In addition, the newer generating plants are extremely complex systems often using nuclear energy reactors as their source of power. The cost of startup and shutdown of such systems is very expensive. All of this has made the use of simulators for training personnel in the operation of electrical generating equipment feasible.

SUMMARY OF THE INVENTION

This invention provides one component system which can be used in a larger simulator complex for training personnel in the techniques used for paralleling alternators. The invention comprises a variable frequency source of electrical energy for each alternator in the system. In addition, means are provided, often a computer, for supplying the appropriate control signals for controlling the frequency of these sources. The outputs from the sources are converted to the appropriate voltage levels and applied directly to a standard, two-way, dynamometer. In addition, the invention of this specification includes a phase comparator for comparing the phase of the signals from the two sources and indicating to the trainee when those signals are in phase.

It is an object of this invention to provide a new and improved training system.

It is another object of this invention to provide a new and improved training device for training personnel in the use of electrical equipment.

It is a further object of this invention to provide a new and improved system for training personnel in paralleling alternators.

Other objects and advantages of this invention will become more apparent as the following description proceeds; which description is to be considered together with the following drawings.

BRIEF DESCRIPTION OF THE DRAWINGS

FIG. 1 is a block diagram of the overall training system in accordance with this invention.

FIG. 2 is a block diagram of the comparator used in the system of FIG. 1.

DESCRIPTION OF THE PREFERRED EMBODIMENT

Referring now to the drawings in detail, and more particularly to FIG. 1 the reference character 11 designates a first oscillator which, for this discussion, will be considered the reference oscillator. A second oscillator 12 has a range of operating frequencies about the center frequency of the reference oscillator 11. An input signal applied to the terminal 13 is applied to the oscillator 12 to control its frequency. The output of the oscillator 11 is applied to the input of an amplifier 14 whose output drives the primary winding of a transformer 16. In a similar manner, the output of the oscillator 12 is applied through a relay switch 43 to the input of an amplifier 15, and the output of the amplifier 15 drives the primary winding of a transformer 17. The output from the oscillator 11 is also applied to the relay switch 43 which is controlled by the relay coil 42. The output from the amplifier 14 is additionally applied to an input 51 of a phase comparator circuit 29. The secondary winding of the transformer 16 has one side connected through a relay switch 27 and the other side connected through a relay switch 19 to the two sides of a winding 37 of a synchroscope 35. The second winding of the transformer 17 has one side connected through a relay switch 28 and the other side connected through the relay switch 19 to a winding 38 of the synchroscope 35. In the other positions, the relay switch 27 and the relay switch 28 connect the secondary windings of the transformers 16 and 17 to the windings 39 and 41, respectively, of a second synchroscope 36. The relay switches 27 and 28 are controlled by a relay coil 21, and the relay switch 19 is controlled by a relay coil 18. A terminal 22 is adapted to be connected to the positive side of a source of electrical energy for application to all of the relay coils 18, 21, and 42. An input terminal 23 is provided to be connected to a control unit such as a digital computer and is connected to the other side of a relay coil 42. The terminals 24 and 25 are also provided to be connected to a control device such as a computer with the terminal 24 connected to the relay coil 18 and the terminal 25 connected to the relay coil 21. The phase comparator circuit 29 is grounded through a line 54, and its output is taken along a line 53 and is applied through a relay switch 26 to the input of power supplies 31 or 32. The relay switch 26 is mechanically ganged to the switches 27 and 28 and controlled by the coil 21. A pair of synchroscope lamps 33 are shown connected between the power supply 31 and switch 26, and a pair of synchroscope lamps 34 are connected between a power supply 32 and switch 26.

The synchroscope training device of FIG. 1 is adapted to be used as a part of a larger training system such as one which simulates a power plant control room. In such large training systems, many computations and control functions are carried out by the use of a digital computer. It is assumed for this discussion that in addition to the structure shown on FIG. 1, the system also includes a digital computer, or its equivalent; an instructor station which contains control switches to clear the system and initiate its operations; and means by which a trainee can control the overall operation of the system. It is further assumed that the inputs from the instructor and the trainee stations are applied through the computer so that the only external inputs to the system of FIG. 1 come from a computer or similar control device. Of course, if the system of FIG. 1 is to be used by itself and not as part of a larger system, then the terminals 13, 23, 24, and 25 may be directly connected to apparatus under the control of the trainee. This apparatus can include single-pole, single-throw switches which have one side connected to the other side of the source of power connected to terminal 22 and have their other sides connected to the terminals 23, 24, and 25; and also a source of variable voltage such as a rheostat connected across a battery with the output of the rheostat connected to the terminal 13. In any case, with no signals applied to the input terminals 23, 24, and 25, and with a voltage at one extreme applied to the input terminal 13; the oscillator 12 oscillates at a frequency which approaches one extreme of its range of frequencies. In the meantime, the oscillator 11, for this discussion, is so connected that it is free-running at a fixed definite frequency such as 60 cycles per second. The outputs from the two oscillators 11 and 12 are applied through the amplifiers 14 and 15 and through the transformers 16 and 17 to the two coils 36 and 38 of the synchroscope 35. When the frequency outputs from the two oscillators 11 and 12 are not the same, the pointer of the synchroscope 35 rotates at a speed which is equal to the difference in the frequencies of the two signals and in a direction which indicates which of the two frequencies is the larger. The signals applied to the input terminal 13 is gradually varied under the control of the trainee, either by changing the output from the computer or by changing the position of the movable contact of the rheostat. As the voltage applied to the oscillator 12 varies. the frequency of the output signal from the oscillator 12 also varies. As the frequency of the oscillator 12 approaches the frequency of the oscillator 11, the speed of rotation of the pointer of the synchroscope 35 gradually decreases. The pointer stops rotating when the frequencies of the two oscillators 11 and 12 are the same. The outputs from the amplifiers 14 and 15 are also applied to the phase comparator circuit 29 which produces an output signal on the line 53 whose amplitude indicates the phase relationship between the signals of the oscillators 11 and 12. This output from the phase comparator 29 is applied to the power supply 31 to control the energization of the lamps 33. As the output from the oscillator 12 is varied, the output signal from the phase comparator 29 changes until the phase of the two oscillators 11 and 12 are the same. At which time, the pointer will rotate to the "12 o'clock" position indicating this situation. When the oscillators 11 and 12 are out of phase, the lamps 33 glow brightly, and the pointer will rotate to the "6 o'clock" position, and as the phases of the two oscillators 11 and 12 gradually approach each other, the intensity of the lamps 33 gradually decreases until they are extinguished when the two oscillators 11 and 12 are in phase. Other devices may be used to control the intensity of the lamps 33 under the control of the output of the phase comparator if desired.

The system shown in FIG. 1 is desired to be used where a plurality of input lines represent a plurality of alternators to be connected in parallel. When a student has paralleled a first pair of alternators using the synchroscope 35 and power supply 31 with the lamps 33, the system may be switched so that the trainee parallels a second pair of alternators using the synchroscope 36, the power supply 32, and the lamps 34. To accomplish this, a signal is applied to the input terminal 25 to energize the relay coil 21 and switch the relay switches 26, 27, and 28 to their other positions. In the other positions, the relay switch 26 connects the power supply 32 to the output of phase comparator 29. In the other positions, the relay switches 27 and 28 connect the oscillators 11 and 12 to the two coils 39 and 41 of the synchroscope 36. The operation of the system then proceeds in the manner described above. The only difference between the two relay positions being that the synchroscope 36 and the lamps 34 are used. For checking purposes, a signal is applied to the terminal 23 to operate the relay coil 42. This changes the position of the relay switch 43 and connects the output of the reference oscillator 11 to both amplifiers 14 and 15. The correct operations of the synchroscope, the power supply, and lamps can then be checked. The relay 42 is also activated after the trainee parallels the two simulated alternators to insure that the effect is properly simulated; i.e., one energy source for both synchroscope coils. When a signal is applied to the input terminal 24, the relay coil 18 is energized to open the relay switch 19. This disconnects the outputs of the two transformers 17 and 16 from the coils of both synchroscopes 35 and 36 permitting the center of gravity of the synchroscope armature to determine the pointer's position.

The system described above is somewhat similar to the system described in the copending patent application Ser. No. 147,021, of Evan E. M. Lloyd. However, in that specification, the phase relation between the two oscillator signals was indicated by the observation of the position in which the synchroscope pointer stopped when the two signals reached the same frequency. The comparator 29 of FIG. 1 provides a much more accurate means for indicating when the two alternators are in phase. The output from the amplifier 14 of FIG. 1 is connected to an input terminal 51 of FIG. 2. The input terminal 51 is connected across voltage maintaining diodes and through an inverter 55 to one input of a NAND gate 57. The terminal 52 is connected to the output of the amplifier 15 and across voltage maintaining diodes and through an inverter 56 to a second input of the gate 57. The output of the gate 57 is applied directly to the trigger input of a one-shot multivibrator 58 and through an inverter 61 to both the trigger input of a one-shot multivibrator 59 and the input of an oscillator 60. The oscillator 60 comprises a pair of cross-connected NAND gates 64 and 65 with the output of the inverter 61 connected to one input of the gate 65, and the output of the gate 64 being connected to the other input of the gate 65. The output of the gate 65 is connected to one input of the gate 64 and the other input of the gate 64 is connected through a feedback path comprising a resistor and a capacitor and including an inverter 63 and an inverter 62. The output of the oscillator 60 is taken from the output of the gate 65 and is connected to the count input of a counter 66. The output from the counter 66 is connected in parallel to the input of a register 67 whose parallel outputs feed a digital-to-analog converter 68. The converter 68 is formed of a plurality of parallel paths each comprising an inverting amplifier 71 and a resistor 72 with one side of all of the paths being connected together and to an output line 73 and the other side of each of the paths being connected to an individual output of the register 67. The line 73 is connected to the base electrode of a transistor 74 whose output is taken across an emitter load resistor and is applied to an output terminal 53 which is connected as shown in FIG. 1. Additionally, line 73 is connected to the computer to indicate to the computer what the phase difference between the two alternators is at any time and in particular when the two are paralleled. Should the phase difference or the frequency difference (which the computer generates) be too large, paralleling of the two alternators is prevented by tripping the paralleling breaker. The output of the one-shot 58 is connected to the load input of the register 67, and the output of the one-shot 59 is connected to the clear input of the counter 66.

When the two signals applied from the amplifiers 14 and 15 to the terminals 51 and 52 are both low, the inverters 55 and 56 apply high inputs to the gate 57. This drives the output from the gate 57 low, and the low is inverted by the inverter 61 to set the one-shot 59 and to enable the oscillator 60. The one-shot 59 clears the counter 66 to zero and the counter 66 begins counting the individual output signals from the oscillator 60. When either of the two input signals applied to the terminals 51 and 52 goes high, the gate 57 closes, disabling the oscillator 60 and setting the one-shot 58. During the time that the one-shot 58 is set, the contents of the counter 66 remains fixed and are loaded into register 67, and the count of the number in the register 67 is converted by the converter 68 into a voltage applied to the line 73. The operation of the digital-to-analog converter and the amplitude of the output voltage is determined by which individual lines are energized by the register 67. The individual resistors 72 in each of the parallel paths have values which are binarily related to each other. In this manner, the amount of resistance in the circuit is determined by the lines which are energized by the register 67, and the output voltage is determined by which of the resistors 72 are connected into the circuit. The voltage appearing on the line 73 is amplified by the transistor 74 and is supplied through the power supply 31 to the lamps 33. The maximum count of the counter 66 indicates when the two signals applied to the terminals 51 and 52 are in phase. This connects the largest number and value of resistors 72 into the circuit of the digital-to-analog converter providing the lowest output voltage on the line 73. As a consequence, the lamps 33 are brightly lit by the input signals when the terminals 51 and 52 are out of phase. Conversely, the lamps 33 are extinguished when the two signals are in phase. During subsequent cycles, the operation repeats itself. The maximum time that the oscillator 60 is enabled is when both signals applied to the terminals 51 and 52 are in phase. Should these two signals be slightly out of phase, then the period when they are both negative is smaller, the oscillator 60 is enabled for a shorter time, and the count in the counter 66 is less. Should the two input signals to terminals 51 and 52 be of opposite phase, then the gate 57 will not open, the oscillator 60 will not be enabled, and the count in the counter 66 will remain at zero.

This specification has described a new and improved training system for training personnel in the use of synchroscopes in the paralleling of alternators. It is realized that the above description may indicate to those skilled in the art additional ways in which the principles of this invention may be used without departing from its spirit. It is, therefore, intended that the invention be limited only by the scope of the appended claims.

What is claimed is:

1. In a training system for training personnel in the use of synchroscopes to parallel alternators, a first oscillator representing a first alternator and a second oscillator representing a second alternator, said second oscillator being frequency adjustable over a range of operating frequencies, a synchroscope, means for connecting the output of said first oscillator to said synchroscope, means for connecting the output of said second oscillator to said synchroscope, means for applying a voltage to said second oscillator to control the frequency at which it operates, a phase comparator, means for connecting the outputs of said first and second oscillators to said phase comparator so that said synchroscope indicates when the frequencies of said first and second oscillators are equal and said phase comparator indicates when said first and second oscillators are in phase, said phase comparator comprising polarity sensitive means having at least two inputs and one output, said polarity sensitive means generating a signal on its output when both of its inputs are of the same polarity, means for connecting one of said inputs to the output of said first oscillator, means for connecting the other of said inputs to the output of said second oscillator, and means connected to the output of said polarity sensitive means for indicating the relative phase relationship between the outputs of said first and second oscillators.

2. The training system defined in claim 1 wherein said means connected to the output of said polarity sensitive means includes a counter and a third oscillator, means for connecting the output of said third oscillator to the count input of said counter, and means responsive to the generation of a signal on the output of said polarity sensitive means for causing said counter to count output signals from said third oscillator.

3. The training system defined in claim 2 wherein said means connected to said polarity sensitive means includes a converter, means for connecting the output of said counter to said converter for converting the digital contents of said counter to a voltage whose amplitude is proportional to the size of said count, and means for connecting the output of said converter to said means for indication relative phase.

4. The training system defined in claim 3 further including means connected to the output of said polarity sensitive means and to said counter to clear said counter to zero in response to the generation of an output by said polarity sensitive means.

5. A system for simulating the operation of a synchroscope in the paralleling of alternators, said system comprising first and second sources of alternating electrical energy, each of said first and second sources representing an alternator, one of said sources at any time having a fixed reference frequency of generation, the other of said sources at any time being variable over a range of operation frequencies, means for applying to said other source electrical signals which determine the frequency of oscillation of said other source at any time, a synchroscope, means for connecting the outputs from said first and second sources to said synchroscope, a phase comparator, means for applying the outputs from said first and second sources to said phase comparator, said phase comparator comprising a device for generating an output signal so long as the input signals applied to it are of the same polarity, and means for applying to the input of said device the outputs from said first and second sources.

6. The system defined in claim 5 wherein said phase comparator further includes a counter, an oscillator having its output connected to the input of said counter, and means responsive to the output signal of said device for causing said oscillator-counter combination to count output pulses from said oscillator only when said output signal is present.

7. The system defined in claim 6 wherein said phase comparator further includes means for converting digital information into voltages, means for connecting the output of said counter to the input of said conversion means, and means connected to the output of said conversion means for indicating the relative phase relationship of the outputs from said first and second sources.

* * * * *